Jan. 29, 1963  H. V. CHAPMAN  3,075,401
LEVER LOCK
Filed March 10, 1961  2 Sheets-Sheet 1
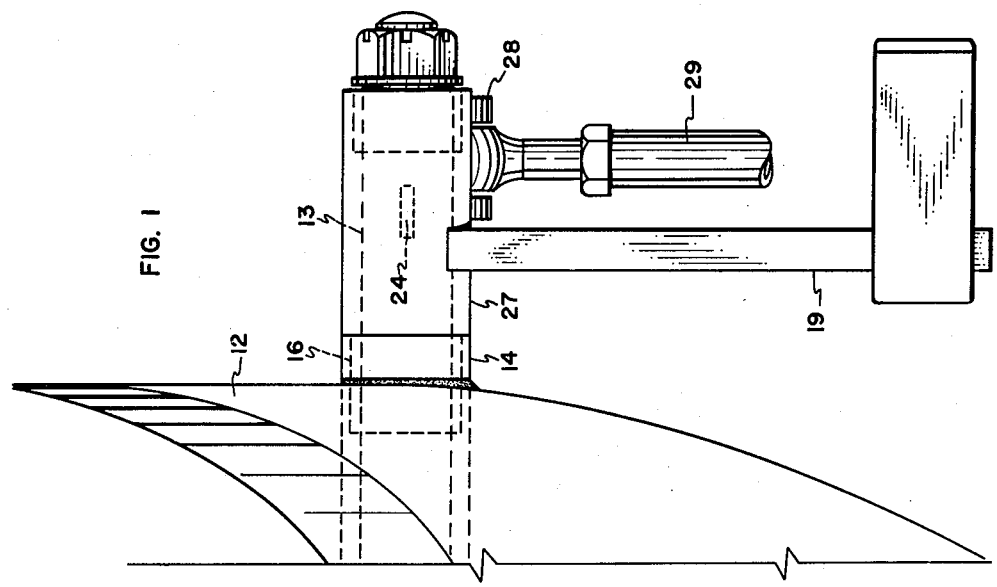
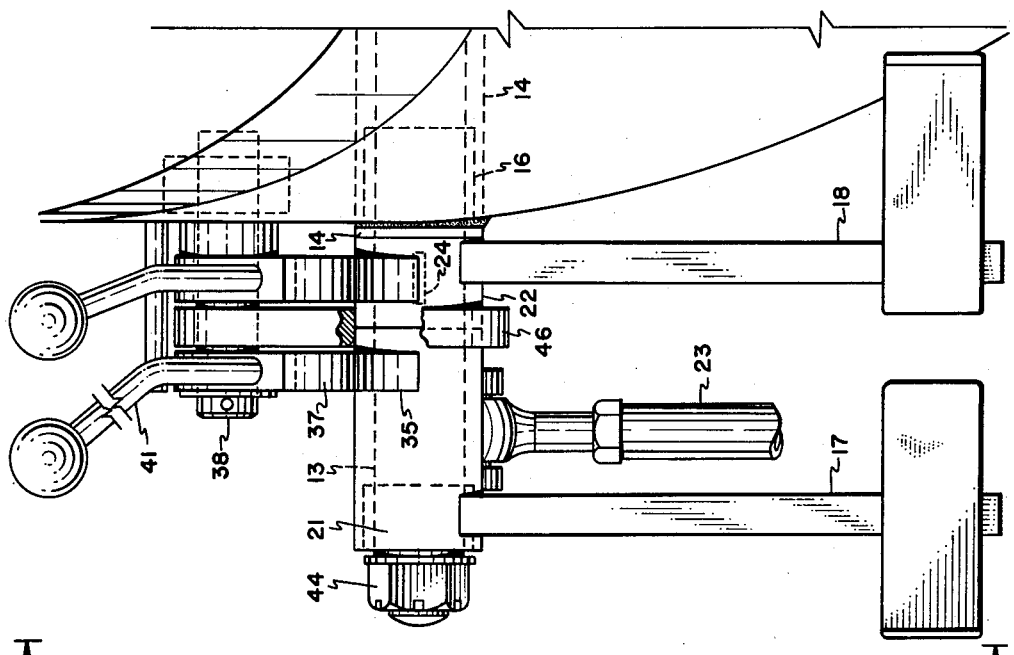
INVENTOR.
HARRY V. CHAPMAN
BY
Robert R. Finch
Attorney Jan. 29, 1963  H. V. CHAPMAN  3,075,401
LEVER LOCK
Filed March 10, 1961  2 Sheets-Sheet 2
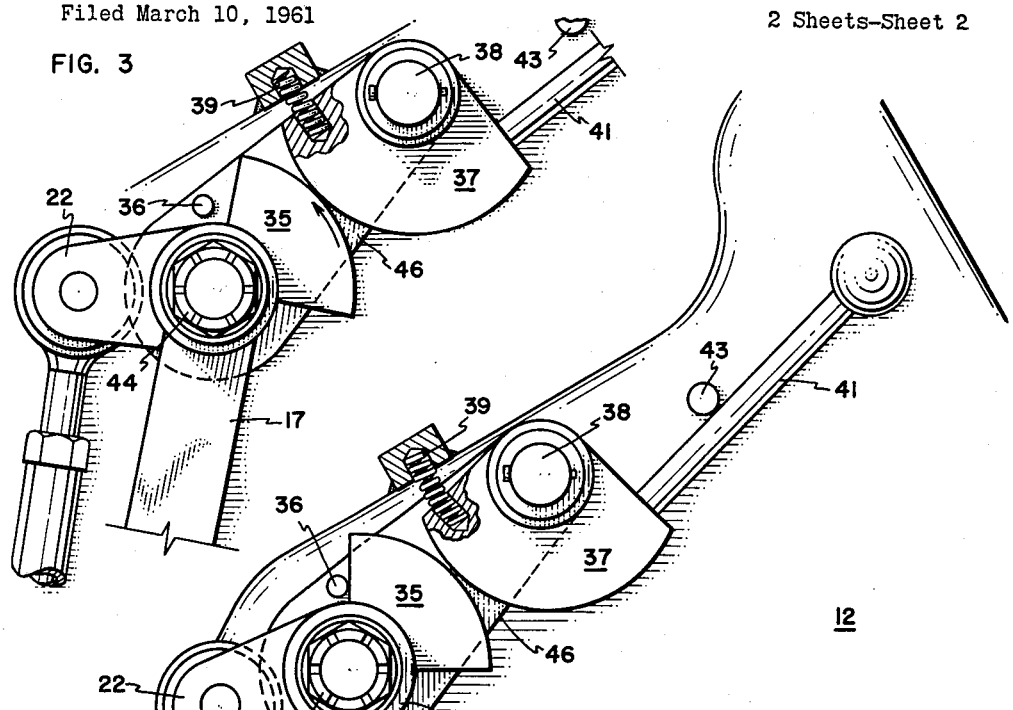
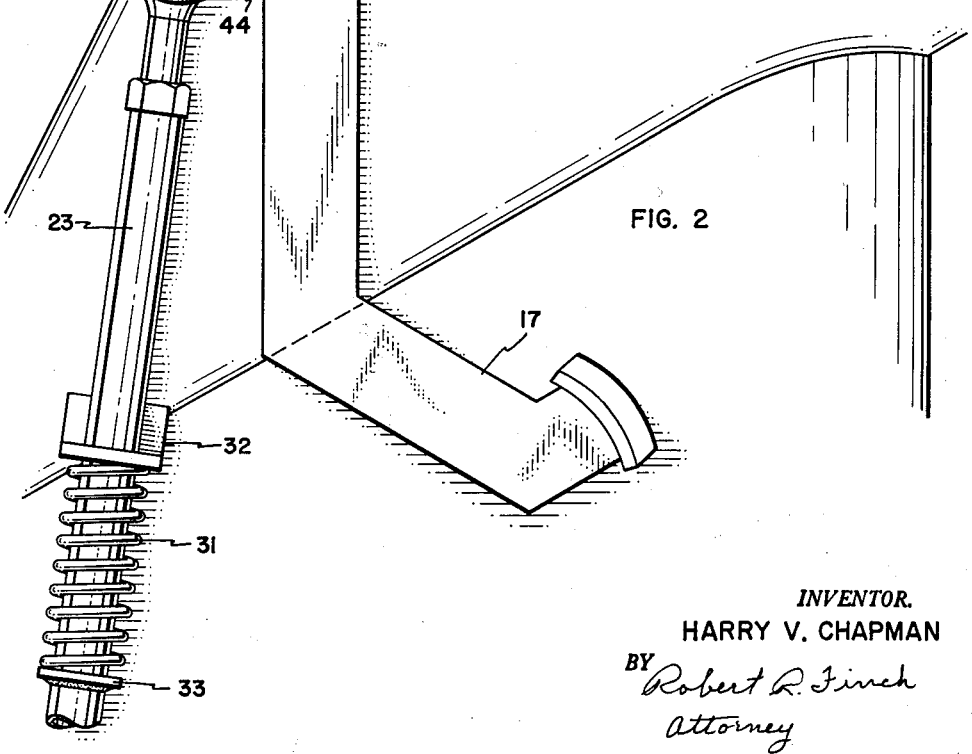
INVENTOR.
HARRY V. CHAPMAN
BY Robert R. Finch
Attorney

United States Patent Office 3,075,401
Patented Jan. 29, 1963

3,075,401
LEVER LOCK
Harry V. Chapman, Salt Lake City, Utah, assignor to The Eimco Corporation, Salt Lake City, Utah, a corporation of Delaware
Filed Mar. 10, 1961, Ser. No. 94,825
1 Claim. (Cl. 74—531)

This invention relates generally to motion transmitting devices such as levers and the like, and in particular to an improved structure providing a simple yet efficient and inexpensive locking clutch and release means for use with such devices.

It is the primary object of the invention to provide an improved manually actuated locking clutch and a simple release means therefor.

It is a further object of the invention to provide a structure embodying the invention and providing an improved linkage system for actuating brakes and the like on industrial vehicles by foot movement, it being the object to provide a more versatile arrangement whereby an operator is provided with a system enabling greater flexibility of movement while still retaining access to foot pedal control.

In order that the invention may be more readily understood and carried into effect, reference is made to the accompanying drawings and the description thereof which are offered by way of illustration only and not in limitation of the invention the scope of which is defined by the appended claim rather than by the preceding description.

In such drawings:

FIG. 1 is a partial straight on view of a system embodying the invention, certain parts being shown in elevation, others in dotted lines, and still others cut away, all for purposes of clarity.

FIG. 2 is a view looking in the direction of arrows 2 of FIG. 1, but simplified to show only one locking element arrangement.

FIG. 3 is a partial view of the structure shown in FIG. 2 illustrating operation thereof.

In the illustrated embodiment there is shown a system particularly useful for actuating brakes on an industrial vehicle such as a tractor.

As is usual in such structures the mounting is by means of a pedestal 12 shown in partial outline form, through which passes a central shaft 13 which passes through a protective tube 14 in which are provided bushings 16 in which the shaft is journalled.

For convenience there is provided one left brake pedal 17 and two connected-together right pedals 18 and 19.

The left pedal is secured to a torque member 21 journalled to rotate about the shaft 13 upon movement of pedal 17 to thereby transmit motion to the brake via link 26 and rod 23.

Pedals 18 and 19 are connected for simultaneous movement by means of keys 24 by which the torque members 22 and 27, to which the pedals are attached, are secured to the shaft. Motion to the brake is transmitted via link 28 and shaft 29.

Both shafts 23 and 29 are spring loaded in the off or unlocked position by springs 31, bracket 32 and stop 33.

Referring in particular to FIGS. 2 and 3 it will be noted that the locking arrangement is illustrated only for a single pedal however, this is adequate since both locks are identical.

Attached to the torque tube or sleeve 21 and moveable therewith is an arcuate clutch member 35 which assumes a position determined by the position of pedal 17 but which, in the embodiment shown has its travel in one direction limited by a stop pin 36.

Locking of the assembly is accomplished by means of a complementary arcuate clutch member 37 which is mounted for eccentric movement about a shaft 38, passing through a bore in the clutch 37 that is offset from the center about which the periphery of the clutch is defined. The clutch member 37 is spring loaded by means of a spring 39 to be rotated about its axis in a direction away from the first clutch member 35; and, since the rotational axis is offset, such rotational motion in counterclockwise direction normally urges the clutch 37 out of contact with clutch 35.

In order to bring the moveable cooperating clutch member 37 into surface to surface contact with the first clutch member 35 a handle 41 is provided that is manually actuated to rotate clutch member 37 toward the clutch member 35. Surface to surface contact provides a lock.

This locking action is illustrated in detail in FIG. 3 where it will be noted that pedal 17 has been depressed thereby rotating the first clutch member 35 and the second member 37 has been forced into contact with the first clutch member so that the surfaces of the members are bearing against each other. When no pressure is applied to pedal 17 then the action of the spring 31 tends to cause rotation of the clutch member 35 in the direction of the arrow as shown on FIG. 3 and this, because of the frictional engagement with the clutch element 37, causes the members to be forced even more tightly together.

In order to release contact and thus release the brake or other clutch member, it is only necessary to further depress the pedal 17 which will rotate clutch member 35 in the opposite direction thus releasing tension on clutch member 37 and causing the spring 39 to rotate the clutch member 37 out of contacting position whereupon the brake pedal is free to move in any direction without interference from the locking clutch.

It will thus be seen that the locking system of the invention comprises a spring loaded actuating pedal 17 and connecting links, a first clutch element 35 associated therewith and moveable in an arc, a second independent clutch element 37 resiliently loaded to be maintained out of contact with the first element and eccentrically mounted to be rotated into contact with said first element against the resilient mounting whereby the resilient means of the first element, after contact between the two elements, serve to maintain the elements in rigid surface to surface contact.

A suitable stop pin 43 may be employed to limit movement of the handle 41. Similarly, assembly on the shaft 13 may be held together by nuts 44 and suitable mounting brackets such as 46 may be provided.

I claim:

In a motion transmitting device of the type including a lever, a driven member moveable between an on and off position and linkage interconnecting said lever and driven member; improved lock means for holding said driven member in a selected position, comprising a first smooth-surfaced arcuate clutch member defined by a single radius and connected to be rotatable upon movement of said lever, a second smooth-surfaced arcuate clutch member defined by a single radius and spaced from said first clutch member, means pivotally mounting said second clutch member for eccentric movement to bring the arcuate surfaces of said first and second clutch members into and out of contact with each other, first resilient means normally urging said second clutch member out of contact with said first clutch member, means for rotating said second clutch member in one direction against the urging of said first resilient means and into contact with said first clutch member, second resilient means mounted to rotatably urge said first clutch member in a direction opposite to said one direction, and said second resilient means being of magnitude sufficient to overcome the urging of said first resilient means when said first and second clutch members are in contact, whereby said second resilient means urges said second clutch member toward said first clutch member against the urging of said first resilient means.

References Cited in the file of this patent

UNITED STATES PATENTS

| | | |
|---|---|---|
| 362,767 | McNair | May 10, 1887 |
| 983,654 | Stewart | Feb. 7, 1911 |
| 1,164,724 | Kilmer | Dec. 21, 1915 |
| 2,326,377 | McBride | Aug. 10, 1943 |
| 2,497,293 | Cade | Feb. 14, 1950 |
| 2,672,061 | Gardner | Mar. 16, 1954 |
| 2,776,702 | Belisle | Jan. 8, 1957 |
| 2,821,275 | Martin | Jan. 28, 1958 |
| 2,977,818 | Strozik | Apr. 4, 1961 |